(12) United States Patent
Lee et al.

(10) Patent No.: US 12,544,557 B2
(45) Date of Patent: Feb. 10, 2026

(54) POSITION DETECTION FOR A CIRCULATORY SUPPORT DEVICE

(71) Applicant: Abiomed, Inc., Danvers, MA (US)

(72) Inventors: Adrienne Lee, Danvers, MA (US); Margi Patel, Danvers, MA (US); Qing Tan, Danvers, MA (US)

(73) Assignee: Abiomed, Inc., Danvers, MA (US)

( * ) Notice: Subject to any disclaimer, the term of this patent is extended or adjusted under 35 U.S.C. 154(b) by 369 days.

(21) Appl. No.: 18/312,032

(22) Filed: May 4, 2023

(65) Prior Publication Data

US 2023/0355958 A1 Nov. 9, 2023

Related U.S. Application Data

(60) Provisional application No. 63/338,471, filed on May 5, 2022.

(51) Int. Cl.

| | |
|---|---|
| *A61M 60/554* | (2021.01) |
| *A61M 60/13* | (2021.01) |
| *A61M 60/216* | (2021.01) |
| *A61M 60/422* | (2021.01) |
| *A61M 60/531* | (2021.01) |

(52) U.S. Cl.
CPC .......... *A61M 60/554* (2021.01); *A61M 60/13* (2021.01); *A61M 60/216* (2021.01); *A61M 60/422* (2021.01); *A61M 60/531* (2021.01); *A61M 2205/18* (2013.01); *A61M 2205/3331* (2013.01)

(58) Field of Classification Search
CPC .. A61M 60/554; A61M 60/13; A61M 60/216; A61M 60/422; A61M 60/531; A61M 2205/18; A61M 2205/3331; A61M 60/538; A61M 60/585; A61M 60/867; A61M 2205/3306; A61M 2205/502; A61M 2205/50

See application file for complete search history.

(56) References Cited

U.S. PATENT DOCUMENTS

| | | |
|---|---|---|
| 6,176,822 B1 | 1/2001 | Nix et al. |
| 11,033,728 B2 | 6/2021 | Schenck et al. |
| (Continued) | | |

OTHER PUBLICATIONS

International Search Report and Written Opinion of the International Searching Authority for International Application No. PCT/US2023/021034 dated Jul. 31, 2023.

*Primary Examiner* — Paula J Stice

(74) *Attorney, Agent, or Firm* — Pierce Atwood LLP

(57) ABSTRACT

Methods and apparatus for determining whether a circulatory support device is correctly positioned in a heart of a patient are provided. The method comprises receiving a motor current signal from a motor of the circulatory support device, receiving a pressure signal from a pressure sensor arranged on the circulatory support device, generating a normalized motor current signal based, at least in part, on the pressure signal, determining a pulsatility of the normalized motor current signal, determining whether the circulatory support device is correctly positioned in the heart of the patient based, at least in part, on the pulsatility of the normalized motor current signal, and outputting an alarm when it is determined that the circulatory support device is not correctly positioned in the heart of the patient.

20 Claims, 10 Drawing Sheets

(56) References Cited

U.S. PATENT DOCUMENTS

| | | | |
|---|---|---|---|
| 2010/0174231 A1* | 7/2010 | Horvath | A61M 60/562 604/67 |
| 2018/0078159 A1 | 3/2018 | Edelman et al. | |
| 2019/0282742 A1 | 9/2019 | El Katerji et al. | |
| 2023/0285740 A1* | 9/2023 | Alwatban | A61M 60/13 |

* cited by examiner

| Condition | | | Optical Pump Position |
|---|---|---|---|
| $I_{mod\_actual} \geq I_{modulation}$ | | $P_{min\_actual} \geq P_{min}$ | OK |
| | | $P_{min\_actual} < P_{min}$ | Placement Signal Low |
| $I_{mod\_actual} < I_{modulation}$ | $P_{mod\_actual} \geq P_{mod}$ | $P_{min\_actual} < P_{min}$ | Ventricle |
| | | $P_{min\_actual} \geq P_{min}$ | Aorta |
| | $P_{mod\_actual} < P_{mod}$ | | Unknown Low Pulse |

FIG. 3A

E2E Current Alg (All Labeled Data)

| True label \ Predicted label | Good | InAorta | InVentricle | UnknownLowPulse | PSLow |
|---|---|---|---|---|---|
| Good | True Neg 1298 47.8% | False Pos 440 16.2% | False Pos 4 0.1% | False Pos 288 10.6% | False Pos 214 7.9% |
| InAorta | False Neg 1 0.0% | True Pos 110 4.1% | False Pos 3 0.1% | False Pos 3 0.1% | False Pos 2 0.1% |
| InVentricle | False Neg 5 0.2% | False Pos 5 0.2% | True Pos 68 2.5% | False Pos 0 0.0% | False Pos 37 1.4% |
| UnknownLowPulse | False Neg 9 0.3% | False Pos 0 0.0% | False Pos 0 0.0% | True Pos 226 8.3% | False Pos 0 0.0% |
| PSLow | False Neg 0 0.0% | False Pos 0 0.0% | False Pos 0 0.0% | False Pos 0 0.0% | True Pos 0 0.0% |

FIG. 3B

| Normalized MC Pulsatility ($I_{mod} / P_{max}$) | AoP Pulsatility | AoP Min | Optical Pump Position |
|---|---|---|---|
| $I_{mod} / P_{max} * 100 \geq I_{mod\_norm\_thresh}$ | | $P_{min\_actual} \geq P_{min}$ | OK |
| | | $P_{min\_actual} < P_{min}$ | Placement Signal Low* |
| $I_{mod} / P_{max} * 100 < I_{mod\_norm\_thresh}$ | $P_{mod\_actual} \geq P_{mod\_thresh}$ | $P_{min\_actual} < P_{min}$ | Ventricle* |
| | | $P_{min\_actual} \geq P_{min}$ | Aorta* |
| | $P_{mod\_actual} < P_{mod\_thresh}$ | | Unknown Low Pulse (#33) |

FIG. 4A

E2E Solution 2 (Scaled by Pmax) + Add Check (All Labeled Data)

| True label \ Predicted label | Good | InAorta | InVentricle | UnknownLowPulse | PSLow |
|---|---|---|---|---|---|
| Good | True Neg 1996 71.9% | False Pos 11 0.4% | False Pos 1 0.0% | False Pos 277 10.0% | False Pos 21 0.8% |
| InAorta | False Neg 2 0.1% | True Pos 78 2.8% | False Pos 5 0.2% | False Pos 33 1.2% | False Pos 1 0.0% |
| InVentricle | False Neg 4 0.1% | False Pos 2 0.1% | True Pos 80 2.9% | False Pos 21 0.8% | False Pos 8 0.3% |
| UnknownLowPulse | False Neg 70 2.5% | False Pos 0 0.0% | False Pos 0 0.0% | True Pos 141 5.1% | False Pos 24 0.9% |
| PSLow | False Neg 0 0.0% | False Pos 0 0.0% | False Pos 0 0.0% | False Pos 0 0.0% | True Pos 0 0.0% |

FIG. 4B

POSITION DETECTION FOR A CIRCULATORY SUPPORT DEVICE

RELATED APPLICATIONS

This application claims the benefit under 35 U.S.C. § 119(e) of U.S. Provisional Patent Application Ser. No. 63/338,471, filed May 5, 2022, and entitled, "POSITION DETECTION FOR A CIRCULATORY SUPPORT DEVICE," the entire contents of which is incorporated herein by reference.

TECHNICAL FIELD

The subject application relates to position detection, in particular to position detection for a circulatory support device.

BACKGROUND

Fluid pumps, such as blood pumps, are used in the medical field in a wide range of applications and purposes. An intravascular blood pump is a pump that can be advanced through a patient's vasculature, i.e., veins and/or arteries, to a position in the patient's heart or elsewhere within the patient's circulatory system. For example, an intravascular blood pump may be inserted via a catheter and positioned to span a heart valve. The intravascular blood pump is typically disposed at the end of the catheter. Once in position, the pump may be used to assist the heart and pump blood through the circulatory system and, therefore, temporarily reduce workload on the patient's heart, such as to enable the heart to recover after a heart attack. An exemplary intravascular blood pump is available from ABIOMED, Inc., Danvers, MA under the tradename Impella® heart pump.

Such pumps can be positioned, for example, in a cardiac chamber, such as the left ventricle, to assist the heart. In this case, the blood pump may be inserted via a femoral artery by means of a hollow catheter and introduced up to and into the left ventricle of a patient's heart. From this position, the blood pump inlet draws in blood and the blood pump outlet expels the blood into the aorta. In this manner, the heart's function may be replaced or at least assisted by operation of the pump.

An intravascular blood pump is typically connected to a respective external heart pump controller that controls the heart pump, such as motor speed, and collects and displays operational data about the blood pump, such as heart signal level, battery temperature, blood flow rate and plumbing integrity. An exemplary heart pump controller is available from ABIOMED, Inc. under the trade name Automated Impella Controller®. The controller raises alarms when operational data values fall beyond predetermined values or ranges, for example if a leak, suction, and/or pump malfunction is detected. The controller may include a video display screen upon which is displayed a graphical user interface configured to display the operational data and/or alarms.

SUMMARY

Described herein are systems and methods for determining a position of a mechanical circulatory device within a heart of a patient.

In some embodiments of the present technology a method of determining whether a circulatory support device is correctly positioned in a heart of a patient is provided. The method comprises receiving a motor current signal from a motor of the circulatory support device, receiving a pressure signal from a pressure sensor arranged on the circulatory support device, generating a normalized motor current signal based, at least in part, on the pressure signal, determining a pulsatility of the normalized motor current signal, determining whether the circulatory support device is correctly positioned in the heart of the patient based, at least in part, on the pulsatility of the normalized motor current signal, and outputting an alarm when it is determined that the circulatory support device is not correctly positioned in the heart of the patient.

In one aspect, the method further comprises determining a maximum pressure value of the pressure signal within a time window of predetermined length, wherein generating the normalized motor current signal based, at least in part, on the pressure signal comprises generating the normalized motor current signal based, at least in part, on the maximum pressure value.

In one aspect, generating the normalized motor current signal based, at least in part, on the maximum pressure value comprises dividing values of the motor current signal by the maximum pressure value.

In one aspect, the pressure sensor comprises an optical pressure sensor.

In one aspect, the method further comprises filtering the motor current signal, wherein generating the normalized motor current signal is based, at least in part, on the filtered motor current signal.

In one aspect, filtering the motor current signal comprises filtering the motor current signal with a bandpass filter.

In one aspect, the bandpass filter is configured to cutoff frequencies below 0.5 Hz and above 5 Hz.

In one aspect, the bandpass filter is configured to cutoff frequencies below 0.65 Hz.

In one aspect, filtering the motor current signal comprises filtering the motor current signal with a lowpass filter.

In one aspect, the method further comprises filtering the pressure signal, wherein generating the normalized motor current signal is based, at least in part, on the filtered pressure signal.

In one aspect, the method further comprises determining a maximum pressure value of the filtered pressure signal within a time window of predetermined length, wherein generating the normalized motor current signal based, at least in part, on the filtered pressure signal comprises generating the normalized motor current signal based, at least in part, on the maximum pressure value.

In one aspect, filtering the pressure signal comprises filtering the pressure signal with a lowpass filter.

In one aspect, the lowpass filter is configured to cutoff frequencies above 5 Hz.

In one aspect, the method further comprises determining a differential pressure signal based, at least in part, on the pressure signal, wherein determining whether the circulatory support device is correctly positioned in the heart of the patient is further based, at least in part, on the differential pressure signal.

In one aspect, the method further comprises determining a minimum pressure value of the pressure signal with a time window of predetermined length, and determining that the circulatory support device is not correctly positioned in the heart of the patient when the pulsatility of the normalized motor current signal is greater than a first threshold value, the minimum pressure value is less than a second threshold, and a minimum value of the differential pressure signal within the time window is greater than a third threshold value or a maximum value of the differential pressure signal within the time window is greater than a fourth threshold value.

In one aspect, the method further comprises determining a pulsatility of the pressure signal, wherein determining whether the circulatory support device is correctly positioned in the heart of the patient is further based, at least in part, on the pulsatility of the pressure signal.

In one aspect, the method further comprises when the pulsatility of the normalized motor current signal is less than a first threshold value and the pulsatility of the pressure signal is less than the second threshold value, determining whether a minimum pressure value within a time window of predetermined length of the pressure signal is greater than a third threshold value, and determining that the circulatory support device is not correctly positioned in the heart of the patient when the minimum pressure value within the time window is less than the third threshold value.

In one aspect, the method further comprises determining that the circulatory support device is located in an aorta of the heart of the patient when the minimum pressure value within the time window is less than the third threshold value, wherein outputting an alarm comprising outputting an alarm that the circulatory support device is located in the aorta.

In one aspect, the method further comprises filtering the pressure signal, wherein determining the pulsatility of the pressure signal comprises determining the pulsatility of the filtered pressure signal.

In one aspect, filtering the pressure signal comprises filtering the pressure signal with a bandpass filter.

In one aspect, the bandpass filter is configured to cutoff frequencies below 0.5 Hz and above 5 Hz.

In one aspect, the bandpass filter is configured to cutoff frequencies below 0.65 Hz.

In one aspect, the method further comprises determining whether a minimum pressure value within a time window of predetermined length of the pressure signal is greater than a second threshold value, and determining that the circulatory support device is correctly positioned in the heart of the patient when the pulsatility of the normalized motor current signal is less than the first threshold value and the minimum pressure value within the time window is greater than the second threshold value.

In one aspect, the method further comprises determining that the circulatory support device is not correctly positioned in the heart of the patient when the pulsatility of the normalized motor current signal is greater than the first threshold value and/or when the minimum pressure value within the time window is less than the second threshold value.

In some embodiments of the present technology, a circulatory support device is provided. The circulatory support device comprises a rotor, a motor configured to drive rotation of the rotor at one or more speeds, a pressure sensor configured to detect a pressure signal, and at least one controller. The at least one controller is configured to receive a motor current signal from the motor, receive a pressure signal from the pressure sensor, generate a normalized motor current signal based, at least in part, on the pressure signal, determine a pulsatility of the normalized motor current signal, determine whether the circulatory support device is correctly positioned in the heart of the patient based, at least in part, on the pulsatility of the normalized motor current signal, and output an alarm when it is determined that the circulatory support device is not correctly positioned in the heart of the patient.

In one aspect, the at least one controller is further configured to determine a maximum pressure value of the pressure signal within a time window of predetermined length, wherein generating the normalized motor current signal based, at least in part, on the pressure signal comprises generating the normalized motor current signal based, at least in part, on the maximum pressure value.

In one aspect, generating the normalized motor current signal based, at least in part, on the maximum pressure value comprises dividing values of the motor current signal by the maximum pressure value.

In one aspect, the pressure sensor comprises an optical pressure sensor.

In one aspect, the at least one controller is further configured to filter the motor current signal, wherein generating the normalized motor current signal is based, at least in part, on the filtered motor current signal.

In one aspect, filtering the motor current signal comprises filtering the motor current signal with a bandpass filter.

In one aspect, the bandpass filter is configured to cutoff frequencies below 0.5 Hz and above 5 Hz.

In one aspect, the bandpass filter is configured to cutoff frequencies below 0.65 Hz.

In one aspect, filtering the motor current signal comprises filtering the motor current signal with a lowpass filter.

In one aspect, the at least one controller is further configured to filter the pressure signal, wherein generating the normalized motor current signal is based, at least in part, on the filtered pressure signal.

In one aspect, the at least one controller is further configured to determine a maximum pressure value of the filtered pressure signal within a time window of predetermined length, wherein generating the normalized motor current signal based, at least in part, on the filtered pressure signal comprises generating the normalized motor current signal based, at least in part, on the maximum pressure value.

In one aspect, filtering the pressure signal comprises filtering the pressure signal with a lowpass filter.

In one aspect, the lowpass filter is configured to cutoff frequencies above 5 Hz.

In one aspect, the at least one controller is further configured to determine a differential pressure signal based, at least in part, on the pressure signal, wherein determining whether the circulatory support device is correctly positioned in the heart of the patient is further based, at least in part, on the differential pressure signal.

In one aspect, the at least one controller is further configured to determine a minimum pressure value of the pressure signal with a time window of predetermined length and determine that the circulatory support device is not correctly positioned in the heart of the patient when the pulsatility of the normalized motor current signal is greater than a first threshold value, the minimum pressure value is less than a second threshold, and a minimum value of the differential pressure signal within the time window is greater than a third threshold value or a maximum value of the differential pressure signal within the time window is greater than a fourth threshold value.

In one aspect, the at least one controller is further configured to determine a pulsatility of the pressure signal, wherein determining whether the circulatory support device is correctly positioned in the heart of the patient is further based, at least in part, on the pulsatility of the pressure signal.

In one aspect, the at least one controller is further configured to when the pulsatility of the normalized motor current signal is less than a first threshold value and the pulsatility of the pressure signal is less than the second threshold value, determine whether a minimum pressure value within a time window of predetermined length of the pressure signal is greater than a third threshold value, and determine that the circulatory support device is not correctly positioned in the heart of the patient when the minimum pressure value within the time window is less than the third threshold value.

In one aspect, the at least one controller is further configured to determine that the circulatory support device is located in an aorta of the heart of the patient when the minimum pressure value within the time window is less than the third threshold value, wherein outputting an alarm comprising outputting an alarm that the circulatory support device is located in the aorta.

In one aspect, the at least one controller is further configured to filter the pressure signal, wherein determining the pulsatility of the pressure signal comprises determining the pulsatility of the filtered pressure signal.

In one aspect, filtering the pressure signal comprises filtering the pressure signal with a bandpass filter.

In one aspect, the bandpass filter is configured to cutoff frequencies below 0.5 Hz and above 5 Hz.

In one aspect, the bandpass filter is configured to cutoff frequencies below 0.65 Hz.

In one aspect, the at least one controller is further configured to determine whether a minimum pressure value within a time window of predetermined length of the pressure signal is greater than a second threshold value, and determine that the circulatory support device is correctly positioned in the heart of the patient when the pulsatility of the normalized motor current signal is less than the first threshold value and the minimum pressure value within the time window is greater than the second threshold value.

In one aspect, the at least one controller is further configured to determine that the circulatory support device is not correctly positioned in the heart of the patient when the pulsatility of the normalized motor current signal is greater than the first threshold value and/or when the minimum pressure value within the time window is less than the second threshold value.

In some embodiments, a method of determining whether a circulatory support device is correctly positioned in a heart of a patient is provide. The method comprises receiving a motor current signal from a motor of the circulatory support device, filtering the motor current signal with a bandpass filter to generate a filtered motor current signal, receiving a pressure signal from a pressure sensor arranged on the circulatory support device, filtering the pressure signal to generate a filtered pressure signal, generating a normalized motor current signal based, at least in part, on the filtered motor current signal and the filtered pressure signal, determining a pulsatility of the normalized motor current signal, determining a pulsatility of the filtered pressure signal, determining a differential pressure signal based, at least in part, on the filtered pressure signal, determining that the circulatory support device is not correctly positioned in the heart of the patient when the pulsatility of the normalized motor current signal is less than a first threshold value, the pulsatility of the filtered pressure signal is less than a second threshold value, a maximum value of the differential pressure signal within a time window of predetermined length is greater than a third threshold value, or a minimum value of the differential pressure signal within the time window is greater than a fourth threshold value, and outputting an alarm when it is determined that the circulatory support device is not correctly positioned in the heart of the patient.

BRIEF DESCRIPTION OF DRAWINGS

FIG. 3A illustrates a truth table representing an algorithm for determining the position of a circulatory support device.

FIG. 3B illustrates a confusion matrix comparing predicted and actual positions of a circulatory support device when the algorithm of FIG. 3A is used to predict the position of the device.

FIG. 4A illustrates a truth table for an improved algorithm for determining the position of a circulatory support device in accordance with some embodiments.

FIG. 4B illustrates a confusion matrix comparing predicted and actual positions of a circulatory support device when the improved algorithm of FIG. 4A is used to predict the position of the device.

DETAILED DESCRIPTION

Figure 1B:
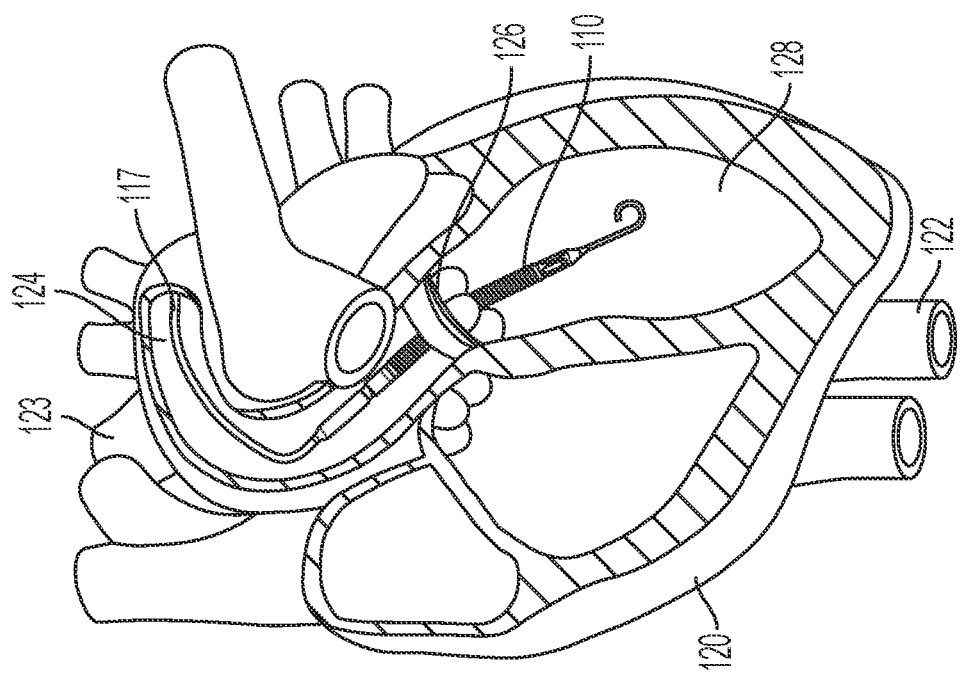
FIG. 1B illustrates the circulatory support device of FIG. 1A positioned within the heart of a patient.

A circulatory support device (also referred to herein as a "heart pump" or simply a "pump") is a percutaneous, catheter-based device that provides hemodynamic support to the heart of a patient. For heart pumps to function properly, they should be positioned correctly in the heart of a patient, with an inlet portion of the pump located in the left ventricle and an outlet portion of the pump located in the aorta, thereby spanning the aortic valve of the patient's heart. As shown in FIG. 1A, a heart pump 110 may include a pigtail 111, an inlet area 112, a cannula 113, a pressure sensor 114, an outlet area 115, a motor housing 116, and/or a catheter tube 117. Pigtail 111 may assist with stabilizing heart pump 110 in the heart of a patient. It should be appreciated that some embodiments of heart pump 110 may not include pigtail 111 and heart pump 110 may be stabilized in other ways or not at all. During operation, blood may be drawn into one or more openings of inlet area 112, channeled through cannula 113, and expelled through one or more openings of outlet area 115 by a motor (not shown) disposed in motor housing 116. In some implementations, pressure sensor 114 may include a flexible membrane that is integrated into cannula 113. One side of pressure sensor 114 may be exposed to the blood pressure on the outside of cannula 113, and the other side may be exposed to the pressure of the blood inside of cannula 113. In some such implementations, pressure sensor 114 may generate an electrical signal proportional to the difference between the pressure outside cannula 113 and the pressure inside cannula 113. In some implementations, a pressure difference measured by pressure sensor 114 may be used, at least in part, to position heart pump 110 within the heart of a patient. In some implementations, pressure sensor 114 is an optical pressure sensor. Catheter tube 117 may provide one or more fluidic and/or electrical connections between heart pump 110 and more or more other devices of a ventricular support system, an example of which is shown in FIG. 1C.

Figure 1A:
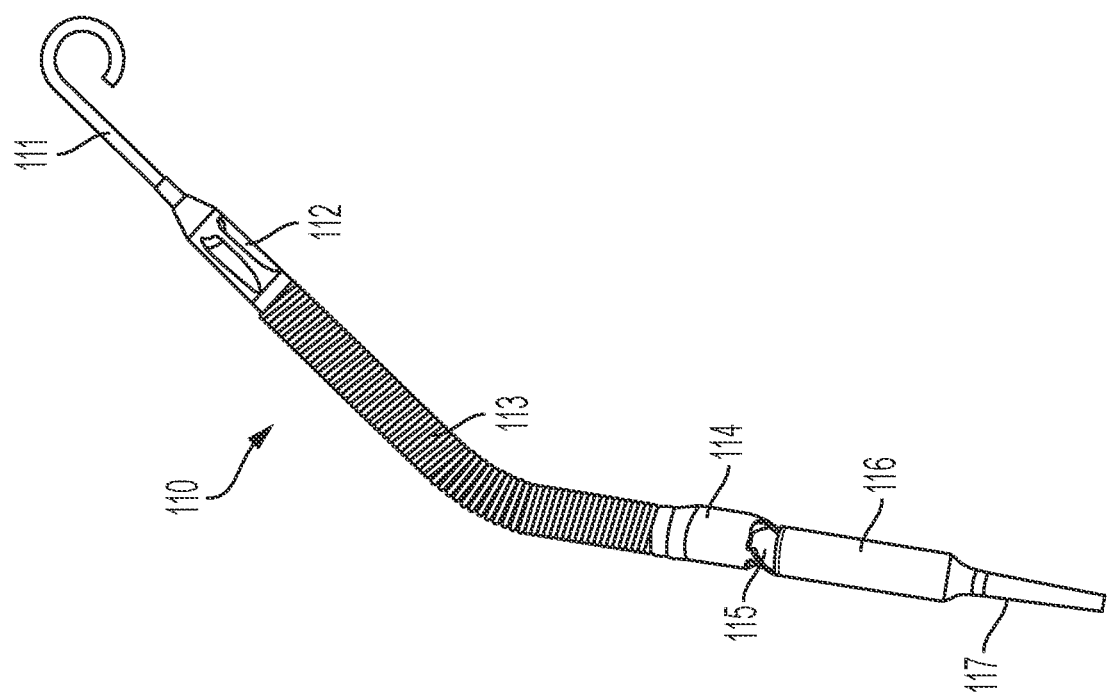
FIG. 1A shows an illustrative circulatory support device that may be used in accordance with some embodiments.

As shown in FIG. 1B, heart pump 110 may be positioned in a patient's heart 120. For example, heart pump 110 may be inserted percutaneously via the femoral artery 122 into the ascending aorta 124, across the aortic valve 126, and into the left ventricle 128. In other implementations, a heart pump may, for example, be inserted percutaneously via the axillary artery 123 into the ascending aorta 124, across the aortic valve 126, and into the left ventricle 128. In other implementations, a heart pump may, for example, be inserted directly into the ascending aorta 124, across the aortic valve 126, and into the left ventricle 128. During operation, heart pump 110 entrains blood from the left ventricle 128 and expels blood into the ascending aorta 124. As a result, heart pump 110 performs some of the work normally done by the patient's heart 120. The hemodynamic effects of heart pumps include an increase in cardiac output, improvement in coronary blood flow resulting in a decrease in left ventricle end-diastolic pressure, pulmonary capillary wedge pressure, myocardial workload, and oxygen consumption.

Figure 1C:
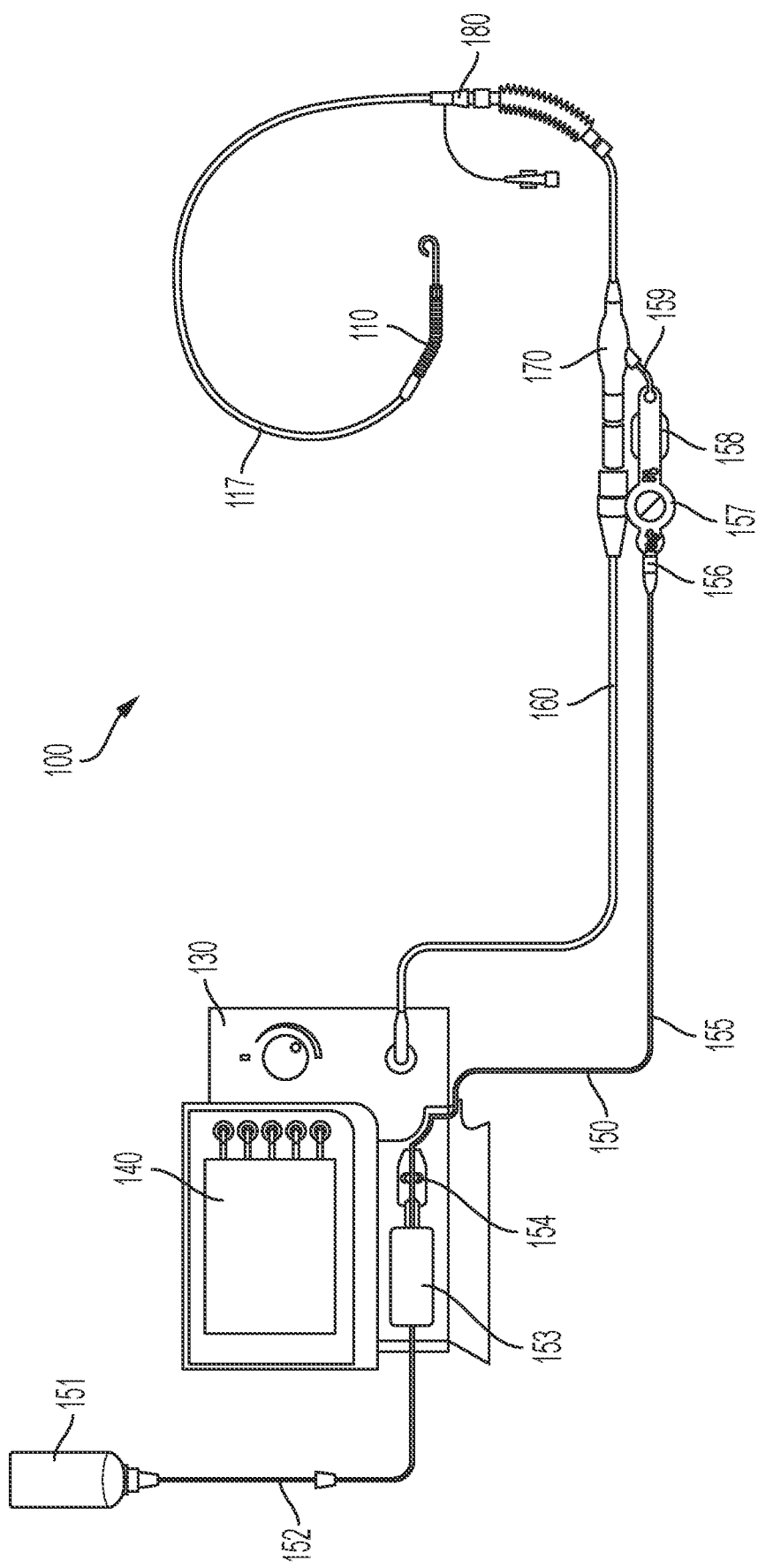
FIG. 1C illustrates a ventricular support system including the circulatory support device of FIG. 1A.

As shown in FIG. 1C, heart pump 110 may form part of a ventricular support system 100. Ventricular support system 100 also includes a controller 130 (e.g., an Automated Impella Controller® from ABIOMED, Inc., Danvers, Mass.), a display 140, a purge subsystem 150, a connector cable 160, a plug 170, and a repositioning unit 180. As shown, controller 130 includes display 140. Controller 130 monitors and controls operation of heart pump 110. During operation, purge subsystem 150 is configured to deliver a purge fluid to heart pump 110 through catheter tube 117 to prevent blood from entering the motor (not shown) within motor housing 116. In some implementations, the purge fluid is a dextrose solution (e.g., 5% dextrose in water with 25 or 50 IU/mL of heparin). Connector cable 160 provides an electrical connection between heart pump 110 and controller 130. Plug 170 connects catheter tube 117, purge subsystem 150, and connector cable 160. In some implementations, plug 170 includes a storage device (e.g., a memory) configured to store, for example, operating parameters to facilitate transfer of the patient to another controller if needed. Repositioning unit 180 may be used to reposition heart pump 110 in the patient's heart.

As shown, purge subsystem 150 includes a container 151, a supply line 152, a purge cassette 153, a purge disc 154, purge tubing 155, a check valve 156, a pressure reservoir 157, an infusion filter 158, and a sidearm 159. Container 151 may, for example, be a bag or a bottle. A purge fluid is stored in container 151. Supply line 152 provides a fluidic connection between container 151 and purge cassette 153. Purge cassette 153 may control how the purge fluid in container 151 is delivered to heart pump 110. For example, purge cassette 153 may include one or more valves for controlling a pressure and/or flow rate of the purge fluid. Purge disc 154 may include one or more pressure and/or flow sensors for measuring a pressure and/or flow rate of the purge fluid. As shown, controller 130 includes purge cassette 153 and purge disc 154. Purge tubing 155 provides a fluidic connection between purge disc 154 and check valve 156. Pressure reservoir 157 provides additional filling volume during a purge fluid change. In some implementations, pressure reservoir 157 includes a flexible rubber diaphragm that provides the additional filling volume by means of an expansion chamber. Infusion filter 158 helps prevent bacterial contamination and air from entering catheter tube 117. Sidearm 159 provides a fluidic connection between infusion filter 158 and plug 170.

During operation, controller 130 may be configured to receive measurements from pressure sensor 114 and purge disc 154 and to control operation of the motor (not shown) within motor housing 116 and purge cassette 153. As noted above, controller 130 is configured to control and measure a pressure and/or flow rate of a purge fluid via purge cassette 153 and purge disc 154. During operation, after exiting purge subsystem 150 through sidearm 159, the purge fluid is channeled through purge lumens (not shown) within catheter tube 117 and plug 170. Sensor cables (not shown) within catheter tube 117, connector cable 160, and plug 170 provide an electrical connection between pressure sensor 114 and controller 130. Motor cables (not shown) within catheter tube 117, connector cable 160, and plug 170 provide an electrical connection between the motor within motor housing 116 and controller 130. During operation, controller 130 is configured to receive measurements from pressure sensor 114 through the sensor cables and to control the electrical power delivered to the motor within motor housing 116 through the motor cables. By controlling the power delivered to the motor within motor housing 116, controller 130 is operable to control the speed of the motor within motor housing 116.

Various modifications can be made to ventricular support system 100 and one or more of its components. For instance, one or more additional sensors may be added to heart pump 100. In another example, a signal generator may be added to heart pump 100 to generate a signal indicative of the rotational speed of the motor within motor housing 116. As yet another example, a second pressure sensor may be added to heart pump 110 near inlet area 112, and the second pressure sensor may be configured to measure a left ventricular blood pressure. In such implementations, additional sensor cables may be disposed within catheter tube 117, connector cable 160, and plug 170 to provide an electrical connection between the one or more additional sensors and controller 130. As yet another example, one or more components of ventricular support system 100 may be separated. For instance, display 140 may be incorporated into another device in communication with controller 130 (e.g., wirelessly or through one or more electrical cables).

Figure 2:
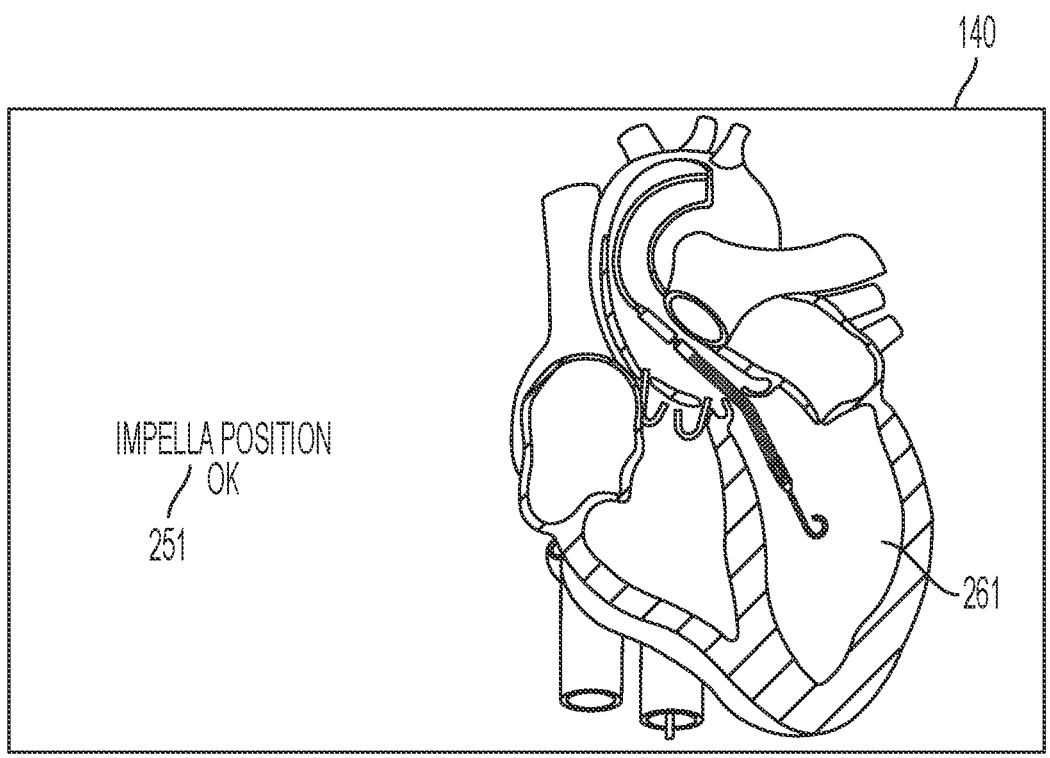
FIG. 2 illustrates a display on which one or more alerts associated with position detection of the circulatory support device of FIG. 1A may be shown in accordance with some embodiments.

As should be appreciated from the foregoing description, proper positioning of the heart pump 110 across a patient's aortic valve is important to ensure that the heart pump 110 operates properly to support the heart function of the patient. Because the position of the heart pump 110 within the patient's heart is typically not precisely known during insertion of the heart pump 110 into the patient's heart or during its operation while in the patient's heart, the position of the heart pump 110 is inferred in some embodiments from sensor information provided by one or more sensors (e.g., pressure sensor 114, motor current sensor (not shown), etc.) coupled to the heart pump 110. The sensor information may be provided to controller 130, which may be configured to determine based, at least in part, on the sensor information, the position of the heart pump 110 in the patient's heart. In some embodiments, controller 130 may be configured to output an alert to display 140 to indicate whether the heart pump 110 is in a desired position (e.g., with inlet area 112 located in the patient's left ventricle and outlet area 115 located in the patient's aorta), as shown, for example, in FIG. 2. As shown, when the heart pump is properly positioned 261 across the aortic valve, display 140 may be configured to display an indication 251 of the proper positioning of the heart pump. Additionally or alternatively, when it is determined by controller 130 that the position of the heart pump 110 is not in a desired position, controller 130 may be configured to output one or more alerts to display 140 to indicate the incorrect positioning of the heart pump 110. Reporting such alerts may be important to ensure that the medical professional (e.g., a physician) inserting and/or monitoring the functioning of the heart pump 110 during operation is made aware of the incorrect placement and can take corrective action to adjust the position of the heart pump 110 in the patient's heart.

In some embodiments, controller 130 may be configured to control display 140 to output one of a plurality of types of alerts when the heart pump 110 is improperly positioned in the patient's heart. For example, as shown in FIG. 3A, controller 130 may be configured to determine based, at least in part, on a motor current signal I and a pressure signal P, whether the position of heart pump is properly positioned (e.g., ok) or improperly positioned (e.g., located in the ventricle, located in the aorta, unknown). One or more of the alerts corresponding to an indication that the heart pump position is improperly positioned, may be associated with different alert levels corresponding to a risk associated with the current positioning of the heart pump. For instance, an indication that the heart pump is located in the ventricle or in the aorta may be associated with a higher (e.g., more risky) alert level compared to an indication that the placement signal (e.g., from the optical pressure sensor) is low or that the pulsatility of the motor current signal is low for an unknown reason. It should be appreciated that any suitable number of alert levels may be assigned. Assigning alert levels to pump position alerts may facilitate a medical professional who is monitoring operation of the heart pump to take appropriately urgent action when such pump position alerts are provided on display 140.

In the example shown in FIG. 3A, the pump position is determined based on three comparisons. As shown in the leftmost column of FIG. 3A, a pulsatility of a motor current signal $I_{mod\_actual}$ within a predetermined time window (e.g., 2 seconds) is compared to a first threshold value $I_{modulation}$. When the heart pump is correctly positioned across the aortic valve, the motor current signal sensed from the pump motor fluctuates in a pulsatile manner as the pump motor operates in coordination with pumping cycle of the patient's heart. Accordingly, as shown in FIG. 3A, when the pulsatility of the motor current signal $I_{mod\_actual}$ is above a threshold $I_{modulation}$, the position of the heart pump may be determined to be ok or unknown. The distinction between these two types of position determinations is based on a comparison of a pressure sensor signal $P_{min\_actual}$ (e.g., from the optical pressure sensor) and a second threshold value $P_{min}$. As shown, when the minimum pressure sensor value $P_{min\_actual}$ within a predetermined time window (e.g., 2 seconds) of the pressure sensor signal is greater than the threshold value $P_{min}$ it may be determined that the pump is correctly positioned. However, if the minimum pressure sensor value $P_{min\_actual}$ within the predetermined time window is less than the threshold value $P_{min}$ it may be determined that the position of the pump cannot be accurately determined since the pressure sensor signal is too low. In such instances, an alert indicating the low pressure signal reading may be output.

Continuing with the example shown in FIG. 3A, when the pulsatility of the motor current signal $I_{mod\_actual}$ is below the threshold $I_{modulation}$, the position of the heart pump may be determined to be in an incorrect position (e.g., located in the ventricle, located in the aorta), or unknown. The distinction between these types of position determinations may further be based on the pressure sensor signal P. Similar to the motor current signal, the pressure sensor signal (e.g., from the optical pressure sensor) may fluctuate in a pulsatile manner depending on the location of the pressure sensor in the heart. As shown, when the pulsatility of the pressure sensor signal $P_{mod\_actual}$ within a predetermined time window (e.g., 2 seconds) is less than a third threshold value $P_{mod}$, it is determined that the pulsatility of pressure signal is too low to make an accurate determination of pump location, and an unknown alert is generated. Alternatively, when the pulsatility of the pressure sensor signal $P_{mod\_actual}$ within the predetermined time window is greater than the third threshold value $P_{mod}$, it is determined that heart pump is incorrectly positioned as being located in the aorta or the ventricle. The distinction between these two position determinations is determined based on a comparison of the pressure sensor signal $P_{min\_actual}$ (e.g., from the optical pressure sensor) and the second threshold value $P_{min}$ as described above. As shown, when the minimum pressure sensor value $P_{min\_actual}$ within a predetermined time window (e.g., 2 seconds) of the pressure sensor signal is greater than the threshold value $P_{min}$ it may be determined that the pump is located in the aorta. However, if the minimum pressure sensor value $P_{min\_actual}$ within the predetermined time window is less than the threshold value $P_{min}$ it may be determined that the position of the pump is located in the ventricle. Improper positioning of the heart pump in the ventricle or the aorta may represent a more serious event for which the medical professional monitoring the heart pump operation may want to take corrective action urgently. Accordingly, as described above, such alerts may be associated with alert levels indicating the urgency of the event to the user of the ventricular assist system.

The inventors have recognized and appreciated that accurate reporting of the positioning of the heart pump via alerts provided to the user of the ventricular assist system are important to ensure that the medical professional monitoring the heart pump operation takes appropriate action. Although false negatives (e.g., not accurately detecting that the heart pump is in the aorta or ventricle) may be the most critical types of position determination errors, generating too many false positives (e.g., detecting that the heart pump is located in the aorta or the ventricle when it is properly positioned) may also have negative consequences. For instance, if such false positive alerts are generated frequently, medical professionals may start ignoring the alerts rather than taking action, when needed, or alternatively perform unnecessary medical procedures (e.g., imaging the heart using ultrasound) when in fact the pump is properly positioned. Additionally, since aorta and/or ventricle alerts may be associated with higher alert levels, the patient may become worried or stressed when such alerts are displayed frequently, resulting in an unpleasant patient experience.

FIG. 3B shows a confusion matrix comparing the results of the predicted position of the heart pump based on the algorithm and metrics shown in FIG. 3A (horizontal axis) and the actual position of the heart pump as verified by a human operator (vertical axis). It should be appreciated that if the algorithm of FIG. 3A was performing error free position detection relative to the human labeled data, all of the values would lie along the diagonal from the upper left to the lower right of the confusion matrix of FIG. 3B. However, as shown, applying the algorithm of FIG. 3A resulted in a substantial number (16.2%) of false positive InAorta alerts, and to a lesser extent a large number of false positive UnknownLowPulse and PSLow alerts when the heart pump was in fact properly positioned. As discussed above, the generation of false positive alerts when the heart pump is properly positioned has multiple negative consequences. To this end, some embodiments are directed to techniques for improving the accuracy of heart pump position estimation based on motor current and pressure sensor signals.

The inventors have recognized and appreciated that multiple adjustments to the algorithm schematically illustrated in FIG. 3A may be made to improve the accuracy of the heart pump position detection. In some embodiments, all of the adjustments described herein may be used, whereas in other embodiments, only one or a subset of the adjustments may be used, and embodiments of the present disclosure are not limited in this respect.

A first adjustment relates to normalizing the motor current signal, and using the normalized motor current signal rather than the raw (or otherwise not normalized) motor current signal to determine the motor current pulsatility within a predetermined time window (e.g., 2 seconds). In some embodiments, the normalization of the motor current signal is based, at least in part, on the pressure sensor signal (e.g., as determined from the optical pressure sensor). The inventors have recognized and appreciated that the motor current signal is more pulsatile at higher pressures, and at lower pressures, the motor current signal is less pulsatile even when the heart pump is properly positioned across the aortic valve. By normalizing the motor current signal based on the measured pressure sensor signal, the patient's actual pressure values are taken into account, which enables the motor current signal to more accurately reflect the patient's true condition prior to assessing the pulsatility of the motor current signal.

A normalization factor based on the measured pressure sensor signal and used to normalize the motor current signal may be determined in any suitable way. In some embodiments, the normalization factor corresponds to the pulsatility of the pressure sensor signal measured within a predetermined time window. In other embodiments, the normalization factor corresponds to the mean arterial pressure (MAP) as measured within a predetermined time window of the pressure sensor signal. In yet other embodiments, the normalization factor corresponds to the maximum pressure value $P_{max}$ as measured within a predetermined time window of the pressure sensor signal. In some instances, the maximum pressure value $P_{max}$ may be used as the normalization factor as it is more tolerant to the heart pump position. For example, using MAP as the normalization factor assumes that the pressure sensor located on the heart pump is in the aorta. However, if the pressure sensor is not located in the aorta, the MAP may not be accurate. By contrast, even when the pressure sensor is not located in the aorta (e.g., the pressure sensor is located in the ventricle), $P_{max}$ will represent the true maximum pressure during systole.

As shown in FIG. 4A, in some embodiments, the normalized motor current signal is generated by dividing the motor current signal (or a processed version of the motor current signal) by the maximum pressure signal $P_{max}$ determined within a time window of predetermined length (e.g., 2 seconds). The pulsatility of the resulting normalized motor current signal $I_{mod}/P_{max}$ (optionally multiplied by a scaling factor 100) is then used, at least in part, to determine whether the heart pump is properly positioned in the heart of the patient.

The inventors have recognized and appreciated that the motor current signal and/or the pressure sensor signal may drift over time. Accordingly, in a second adjustment to the algorithm of FIG. 3A, the motor current signal (or a processed version of the motor current signal) and/or the pressure sensor signal (or a processed version of the pressure sensor signal) is filtered prior to being used for estimation of pump position. In some embodiments, the motor current signal is filtered, and the filtered motor current signal is then normalized using one or more of the normalization techniques described herein.

Any suitable filter may be applied to filter the motor current signal and/or the pressure sensor signal. The inventors have recognized and appreciated that respiratory effects, coughing, and/or other factors may contribute to the calculated pulsatility of the motor current signal and/or the pressure sensor signal. To adjust for such factors, one or both of the motor current signal and the pressure sensor signal may be filtered using a bandpass filter configured to perform baseline correction of the corresponding signal. Any suitable cutoff frequencies may be used. In some embodiments, the bandpass filter may have a low end cutoff of 0.5 Hz and a high end cutoff of 5 Hz. In other embodiments, the bandpass filter may have a low end cutoff of 0.65 Hz. In some embodiments, the cutoff frequencies may be selected to be inclusive of a typical range of heart rates observed by patients who may use the heart pump. In some embodiments, the pressure sensor signal may be filtered, and a normalized motor current may be generated based, at least in part, on the filtered pressure sensor signal. For instance the normalization factor (e.g., MAP, $P_{max}$, etc.) may be determined based on the filtered pressure sensor signal. Any suitable filter may be applied to filter the pressure sensor signal. For instance, in some embodiments the pressure sensor signal is filtered using a lowpass filter. Any suitable cutoff frequencies may be used for the lowpass filter. For instance in some embodiments, the lowpass filter has a cutoff frequency of 5 Hz. In some embodiments, the pressure sensor signal may be filtered differently depending on the pressure metric desired to be calculated from the filtered pressure sensor signal. For instance, to calculate the pulsatility of the pressure sensor signal, the pressure sensor signal may first be filtered using a bandpass filter (as described above), and to calculate the maximum pressure value $P_{max}$ or the minimum pressure value $P_{min\_actual}$ (or, e.g., any other absolute parameters), the pressure sensor signal may first be filtered using a low pass filter. In this way, one or multiple filtered motor current signals and/or pressure sensor signals may be generated based on the desired corresponding motor current and/or pressure metrics to be determined.

The inventors have recognized and appreciated that at higher pump speeds when the pump is doing most of the pumping for the heart so the valves do not open much, there is a separation of the aortic signal and the ventricular signal, resulting in a dampened left ventricular signal which looks similar to a suction condition. Under such circumstances since it cannot be determined whether a suction condition has occurred or whether the heart pump is in a desired position, in some embodiments, a third adjustment to the algorithm of FIG. 3A is to perform one or more additional checks when the heart pump position is determined to be improperly positioned (e.g., located in the aorta or located in the ventricle) and/or when the pump position is determined to be unknown.

In accordance with one such additional check, a differential pressure signal dP across the aortic valve is determined based, at least in part, on the pressure sensor signal. As described above in connection with FIGS. 1A-1C, a heart pump may include a pressure sensor (e.g., an optical pressure sensor) configured to detect a patient's aortic pressure when the heart pump is properly positioned in the patient's heart. The heart pump may not include another pressure sensor configured to detect the patient's ventricular pressure. In such instances, the differential pressure signal dP may be determined indirectly using the measured aortic pressure, the measured motor current and a lookup table that maps motor current values to dP values for the heart pump. In some embodiments, the left ventricular pressure (LVP) may also be indirectly determined. For instance, the LVP may be determined using the measured aortic pressure signal and known pressure difference dP across the aortic valve. A decoupling of the dP and the LVP signals suggests that a suction event has occurred and an alert indicating the same may be displayed via the display 140 to inform the medical professional monitoring operation of the heart pump to move the heart pump to correct the suction condition.

In some embodiments, the one or more additional checks include determining whether a minimum of the dP signal $dP_{min}$ within a time range of predetermined length (e.g., 2 seconds) is greater than a threshold value. In some embodiments, the one or more additional checks include determining whether a maximum of the dP signal $dP_{max}$ within a time range of predetermined length (e.g., 2 seconds) is greater than a threshold value. Based on the one or more additional checks, an appropriate alert may be generated in an effort to further reduce false positives with regard to positioning of the heart pump within the aorta or ventricle.

FIG. 4B shows a confusion matrix comparing the results of the predicted position of the heart pump based on the algorithm and metrics shown in FIG. 4A (horizontal axis) and the actual position of the heart pump as verified by a human operator (vertical axis). Compared with the confusion matrix shown in FIG. 3B, it can be observed that the number of false positive InAorta alerts has been reduced substantially (0.4% in FIG. 4B compared to 16.2% in FIG. 3B), thereby demonstrating the effectiveness of the improved algorithm. Moderate improvements in other cases was also observed. For instance, the false positive rate for PSLow alerts was reduced from 7.9% using the algorithm of FIG. 3A to 0.8% using the algorithm of FIG. 4A. Notably, the false negative rate did not substantially change for the two conditions InAorta and InVentricle that signify an improper placement of the heart pump in the heart.

Figure 5:
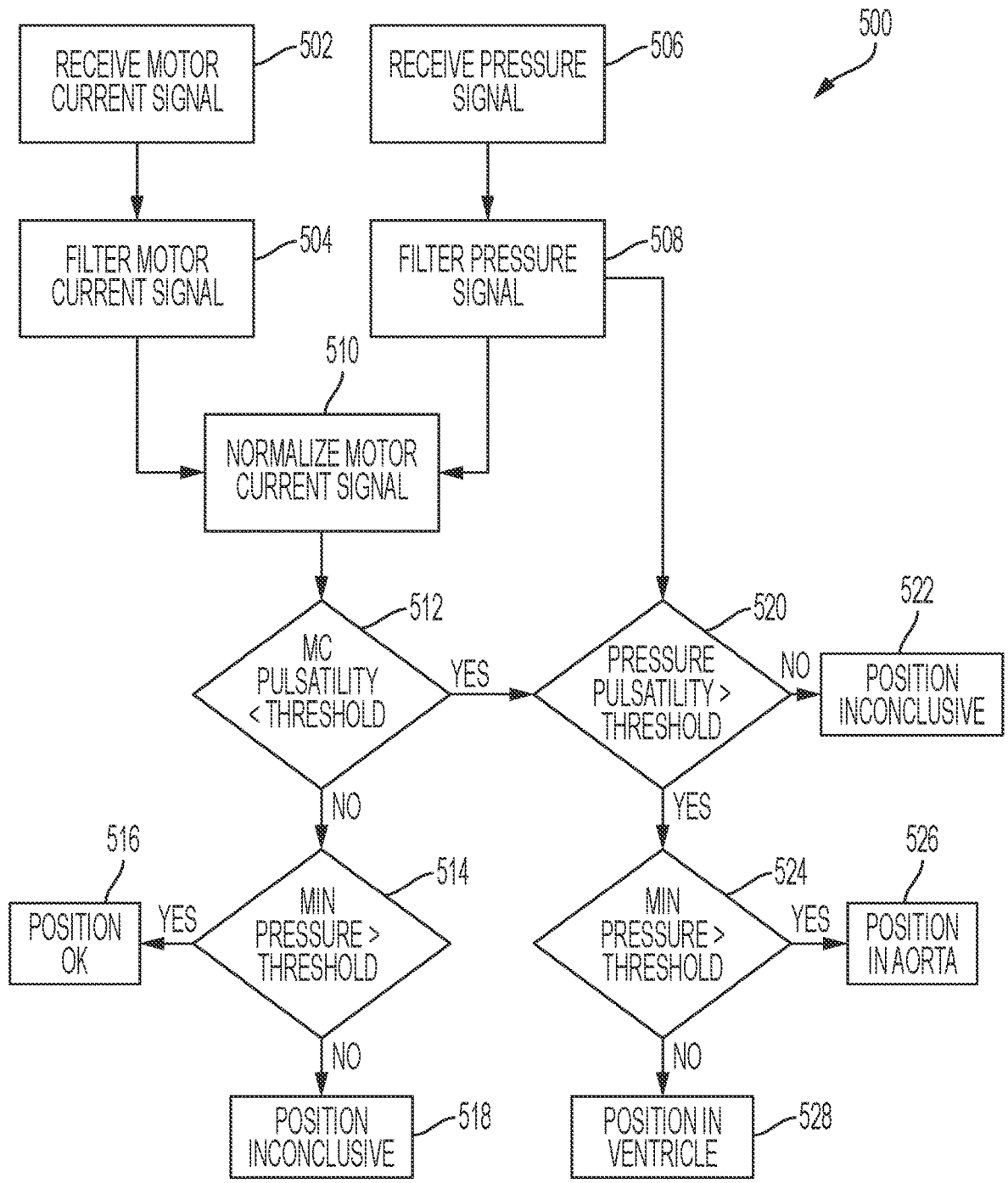
FIG. 5 illustrates a flowchart of a process for determining the position of a circulatory support device in accordance with some embodiments.

FIG. 5 is a flowchart of a process 500 for an improved position detection technique in accordance with some embodiments. In act 502, the motor current signal associated with an operating state of the motor within the heart pump is received. Process 500 then proceeds to act 504, where the received motor current signal is filtered (e.g., using a bandpass filter as described above). In act 506, the pressure sensor signal (e.g., from the optical pressure sensor located on the heart pump) is received. Process 500 then proceeds to act 508, where the received pressure sensor signal is filtered (e.g., using a low-pass filter and/or a bandpass filter, as described above). Process 500 then proceeds to act 510, where the filtered motor current signal and the filtered pressure signal are used to generate a normalized motor current signal. For instance, as described above, the values of the filtered motor current signal may be divided by the maximum pressure $P_{max}$ determined within a predetermined time window of the pressure sensor signal.

Process 500 then proceeds to act 512 where the pulsatility of the normalized motor current signal is determined and compared to a first threshold value. If it is determined in act 512 that the pulsatility of the normalized motor current signal is less than the first threshold value, process 500 then proceeds to act 514, where it is determined whether a measured minimum pressure value from the pressure sensor signal is greater than a second threshold value. If it is determined in act 514 that the minimum pressure value is greater than the second threshold value, process 500 proceeds to act 516, where it is determined that the position of the heart pump is ok. If it is determined in act 514 that the minimum pressure value is less than the second threshold value, process 500 proceeds to act 518, where it is determined that the position of the heart pump is inconclusive. Upon determining that the position of the heart pump is inconclusive one or more additional checks may be performed to assess whether the pump position is ok, as described above, despite the low pressure measurement.

If it is determined in act 512 that the pulsatility of the motor current signal is less than the first threshold value, process 500 proceeds to act 520, where the pulsatility of the filtered pressure sensor signal is determined and compared to a third threshold value. If it is determined in act 520 that the pulsatility of the filtered pressure sensor signal is not greater than the third threshold value, process 500 proceeds to act 522 where it is determined that the heart pump position is inconclusive. One or more additional checks may be performed, as described above, to determine whether the pump is correctly positioned despite the low pulsatility of the pressure signal. If it is determined in act 520 that the pulsatility of the pressure signal is greater than the third threshold value, process 500 proceeds to act 524, where it is determined whether a measured minimum pressure value from the pressure sensor signal is greater than a fourth threshold value. If it is determined in act 524 that the minimum pressure value is greater than the fourth threshold value, process 500 proceeds to act 526, where it is determined that the position of the heart pump is in the aorta. As described above, in some embodiments one or more additional checks are performed when it is determined that the pump position is located in the aorta in an effort to avoid generating a false positive alert when the pump is correctly positioned. If it is determined in act 524 that the minimum pressure value is less than the fourth threshold value, process 500 proceeds to act 528, where it is determined that the position of the heart pump is located in the ventricle. Upon determining that the position of the heart pump is located in the ventricle one or more additional checks may be performed, in an effort to avoid generating a false positive alert when the pump is correctly positioned.

Figure 6A:
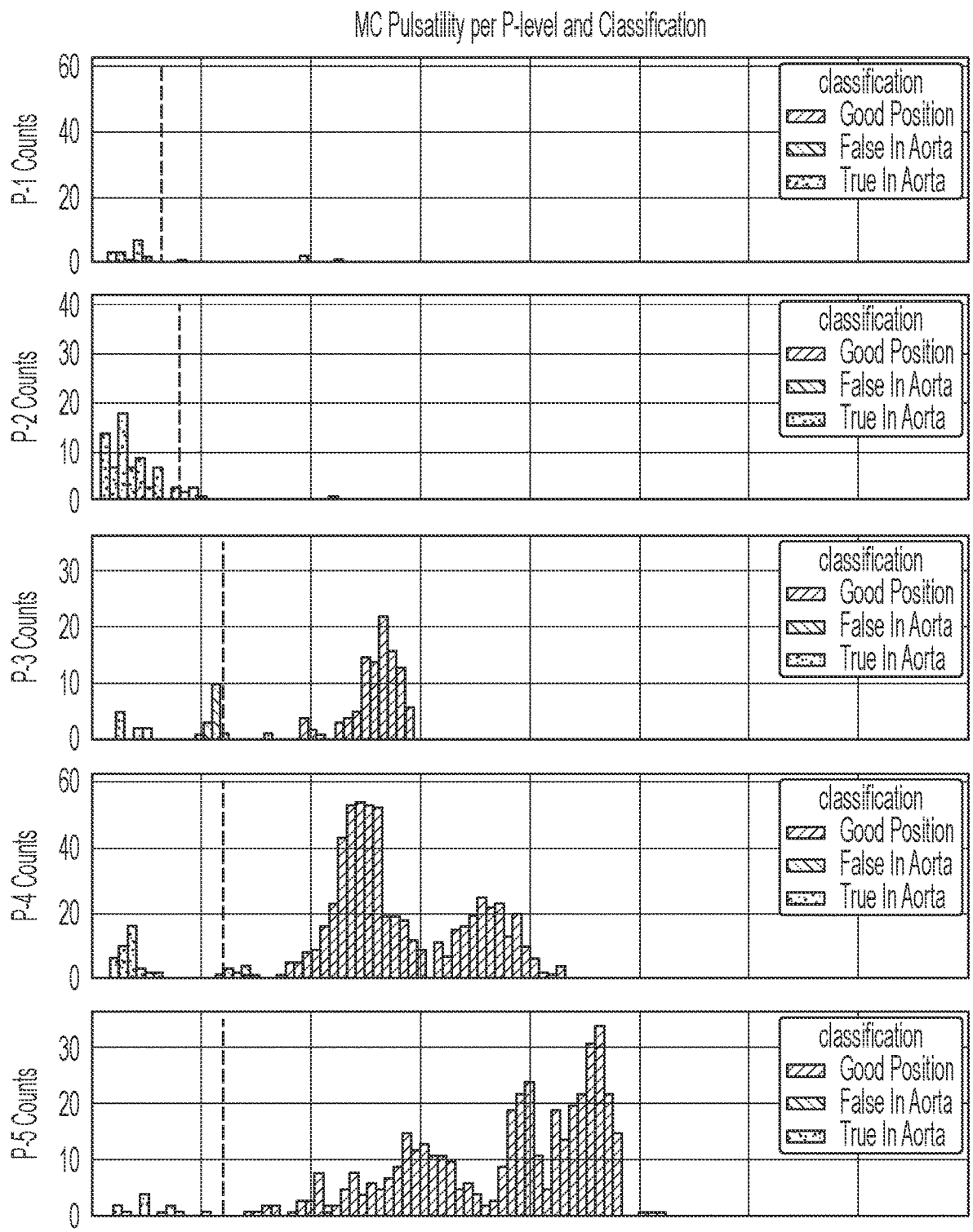
FIGS. 6A-6B illustrate bar charts of classifications made using the algorithm of FIG. 3A at different motor speeds.
Figure 6B:
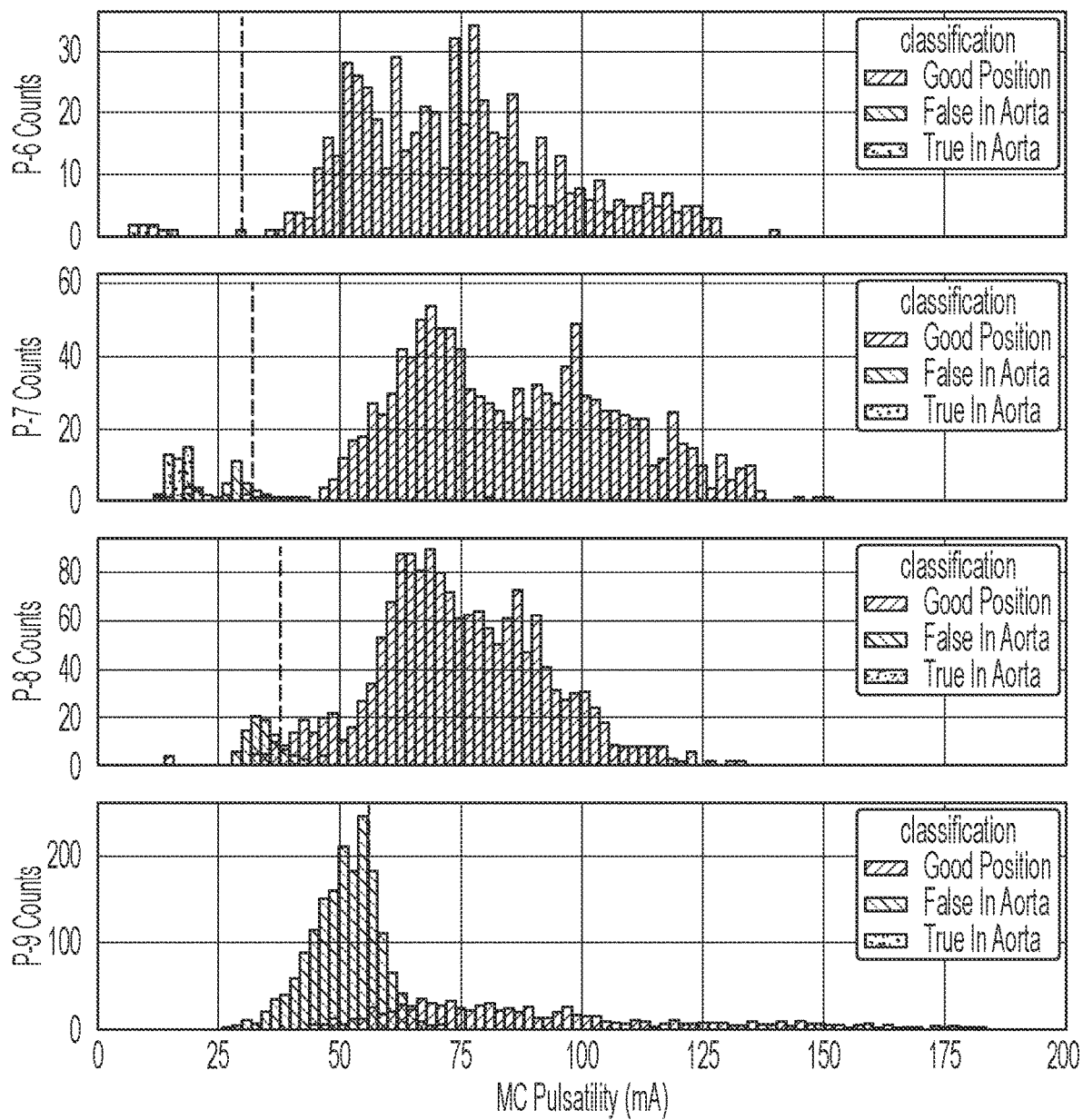

The first, second, third and fourth threshold values may be set in any suitable way. In some embodiments at least some of the threshold values are set based on empirical data describing the types of errors generated. FIGS. 6A-B illustrate bar charts showing distributions for different classifications made using the algorithm shown in FIG. 3A. The vertical axis represents the number of classifications and the horizontal axis represents the normalized motor current value. The motor of the heart pump may be configured to operate at one of a plurality of fixed speeds (e.g., designated as P1 to P9), and the classifications generated at different motor speeds may also differ. FIGS. 6A-6B include separate bar charts for each motor speed P1-P9. As discussed above, a motivating factor for improving the algorithm of FIG. 3A was to reduce false positives in which the algorithm determined that the heart pump was located in the aorta when in fact the heart pump was properly positioned across the aortic valve. As shown in FIGS. 6A-6B one way to conceptualize a solution to this problem is to determine a threshold that separates instances in which a false positive inAorta classification was determined by the algorithm and instances in which a true inAorta classification was determined by the algorithm. For each of the motor speeds P1-P9 represented in FIGS. 6A-6B a dotted line representing a threshold value that best separates the two populations described above is shown. As should be appreciated from FIGS. 6A-6B, at many motor current speeds the "False In Aorta" and "True In Aorta" classifications are largely overlapping making determination of an appropriate threshold difficult. The overlap is even more pronounced at faster motor speeds (e.g., P8-P9) in which the number of false positives for the inAorta classification are increased relative to slower motor speeds.

Figure 7A:
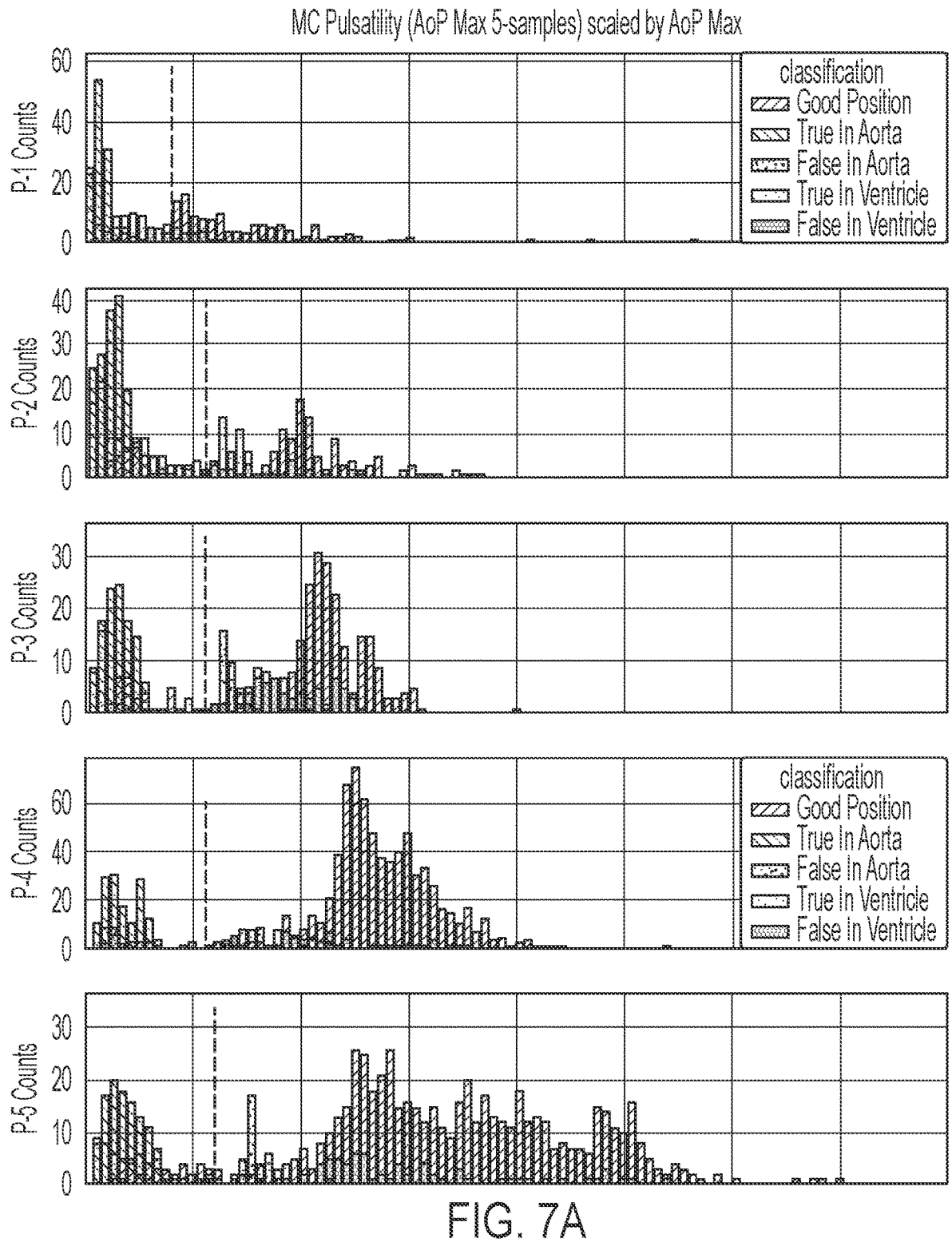
FIGS. 7A-7B illustrate bar charts of classifications made using the improved algorithm of FIG. 4A at different motor speeds.
Figure 7B:
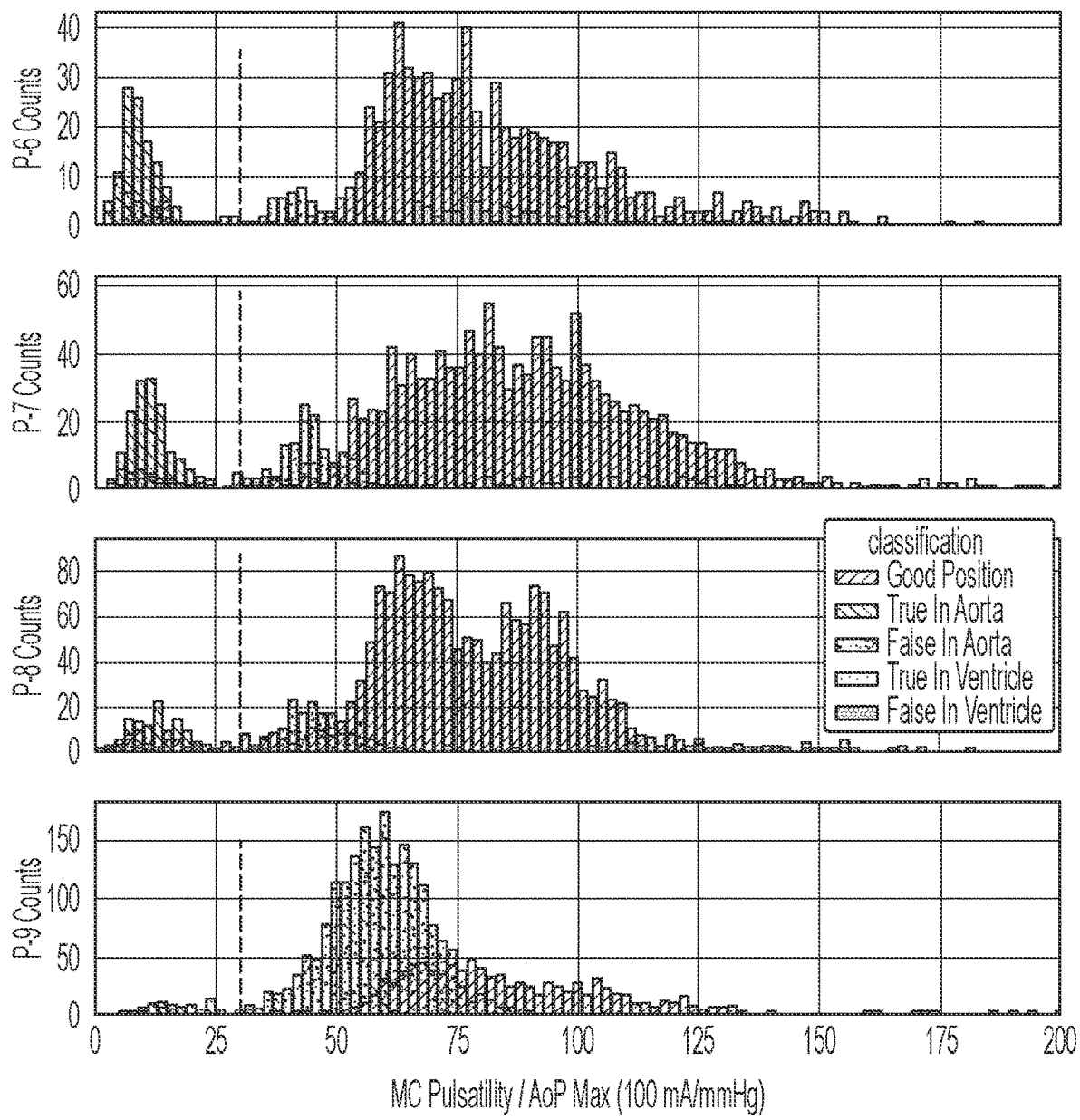

FIGS. 7A-B illustrate bar charts showing distributions for different classifications made using the improved algorithm shown in FIG. 4A. Similar to the bar charts shown in FIGS. 6A-6B, a threshold designed to separate false inAorta classifications and true inAorta classification for each of the motor speeds P1-P9 is represented as a dotted line in FIGS. 7A-7B. As should be appreciated from FIGS. 7A-7B, the improved algorithm used to determine heart pump position in accordance with some embodiments generates distributions of false inAorta classifications and true inAorta classifications that are substantially non-overlapping. At faster motor speeds (e.g., P8-P9), although the number of false positives for the inAorta classification remains larger than at slower motor speeds, their distribution as a function of normalized motor current is separated from the distribution of true inAorta classifications, which enables an appropriate threshold (e.g., the "first threshold value" described in act 512 of FIG. 5 or $I_{mod\_norm\_thresh}$ shown in the algorithm of FIG. 4A) to be drawn between the two populations to separate them for different motor speeds.

Having thus described several aspects and embodiments of the technology set forth in the disclosure, it is to be appreciated that various alterations, modifications, and improvements will readily occur to those skilled in the art. Such alterations, modifications, and improvements are intended to be within the spirit and scope of the technology described herein. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The above-described embodiments can be implemented in any of numerous ways. One or more aspects and embodiments of the present disclosure involving the performance of processes or methods may utilize program instructions executable by a device (e.g., a computer, a processor, or other device) to perform, or control performance of, the processes or methods. In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement one or more of the various embodiments described above. The computer readable medium or media can be transportable, such that the program or programs stored thereon can be loaded onto one or more different computers or other processors to implement various ones of the aspects described above. In some embodiments, computer readable media may be non-transitory media.

The above-described embodiments of the present technology can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as a controller that controls the above-described function. A controller can be implemented in numerous ways, such as with dedicated hardware, or with general purpose hardware (e.g., one or more processor) that is programmed using microcode or software to perform the functions recited above, and may be implemented in a combination of ways when the controller corresponds to multiple components of a system.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a Personal Digital Assistant (PDA), a smartphone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible formats.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A method of determining whether a circulatory support device is correctly positioned in a heart of a patient, the method comprising:
   receiving a motor current signal from a motor of the circulatory support device;
   receiving a pressure signal from a pressure sensor arranged on the circulatory support device;
   generating a normalized motor current signal based, at least in part, on the pressure signal;
   determining a pulsatility of the normalized motor current signal;
   determining whether the circulatory support device is correctly positioned in the heart of the patient based, at least in part, on the pulsatility of the normalized motor current signal; and
   outputting an alarm when it is determined that the circulatory support device is not correctly positioned in the heart of the patient.

2. The method of claim 1, further comprising:
   determining a maximum pressure value of the pressure signal within a time window of predetermined length,
   wherein generating the normalized motor current signal based, at least in part, on the pressure signal comprises generating the normalized motor current signal based, at least in part, on the maximum pressure value.

3. The method of claim 2, wherein generating the normalized motor current signal based, at least in part, on the maximum pressure value comprises dividing values of the motor current signal by the maximum pressure value.

4. The method of claim 1, wherein the pressure sensor comprises an optical pressure sensor.

5. The method of claim 1, further comprising:
   filtering the motor current signal,
   wherein generating the normalized motor current signal is based, at least in part, on the filtered motor current signal.

6. The method of claim 5, wherein filtering the motor current signal comprises filtering the motor current signal with a bandpass filter.

7. The method of claim 1, further comprising:
   filtering the pressure signal,
   wherein generating the normalized motor current signal is based, at least in part, on the filtered pressure signal.

8. The method of claim 7, further comprising:
   determining a maximum pressure value of the filtered pressure signal within a time window of predetermined length,
   wherein generating the normalized motor current signal based, at least in part, on the filtered pressure signal comprises generating the normalized motor current signal based, at least in part, on the maximum pressure value.

9. The method of claim 7, wherein filtering the pressure signal comprises filtering the pressure signal with a lowpass filter.

10. The method of claim 9, wherein the lowpass filter is configured to cutoff frequencies above 5 Hz.

11. The method of claim 1, further comprising:
    determining a differential pressure signal based, at least in part, on the pressure signal, wherein determining whether the circulatory support device is correctly positioned in the heart of the patient is further based, at least in part, on the differential pressure signal.

12. The method of claim 11, further comprising:
determining a minimum pressure value of the pressure signal with a time window of predetermined length; and
determining that the circulatory support device is not correctly positioned in the heart of the patient when:
the pulsatility of the normalized motor current signal is greater than a first threshold value;
the minimum pressure value is less than a second threshold; and
a minimum value of the differential pressure signal within the time window is greater than a third threshold value or a maximum value of the differential pressure signal within the time window is greater than a fourth threshold value.

13. The method of claim 1, further comprising:
determining a pulsatility of the pressure signal,
wherein determining whether the circulatory support device is correctly positioned in the heart of the patient is further based, at least in part, on the pulsatility of the pressure signal.

14. The method of claim 13, further comprising:
when the pulsatility of the normalized motor current signal is less than a first threshold value and the pulsatility of the pressure signal is less than a second threshold value,
determining whether a minimum pressure value within a time window of predetermined length of the pressure signal is greater than a third threshold value; and
determining that the circulatory support device is not correctly positioned in the heart of the patient when the minimum pressure value within the time window is less than the third threshold value.

15. The method of claim 14, further comprising:
determining that the circulatory support device is located in an aorta of the heart of the patient when the minimum pressure value within the time window is less than the third threshold value, wherein
outputting an alarm comprising outputting an alarm that the circulatory support device is located in the aorta.

16. The method of claim 13, further comprising:
filtering the pressure signal,
wherein determining the pulsatility of the pressure signal comprises determining the pulsatility of the filtered pressure signal.

17. The method of claim 1, further comprising:
determining whether a minimum pressure value within a time window of predetermined length of the pressure signal is greater than a second threshold value; and
determining that the circulatory support device is correctly positioned in the heart of the patient when the pulsatility of the normalized motor current signal is less than a first threshold value and the minimum pressure value within the time window is greater than the second threshold value.

18. The method of claim 17, further comprising:
determining that the circulatory support device is not correctly positioned in the heart of the patient when the pulsatility of the normalized motor current signal is greater than the first threshold value and/or when the minimum pressure value within the time window is less than the second threshold value.

19. A circulatory support device, comprising:
a rotor;
a motor configured to drive rotation of the rotor at one or more speeds;
a pressure sensor configured to detect a pressure signal; and
at least one controller configured to:
receive a motor current signal from the motor;
receive a pressure signal from the pressure sensor;
generate a normalized motor current signal based, at least in part, on the pressure signal;
determine a pulsatility of the normalized motor current signal;
determine whether the circulatory support device is correctly positioned in a heart of a patient based, at least in part, on the pulsatility of the normalized motor current signal; and
output an alarm when it is determined that the circulatory support device is not correctly positioned in the heart of the patient.

20. A method of determining whether a circulatory support device is correctly positioned in a heart of a patient, the method comprising:
receiving a motor current signal from a motor of the circulatory support device;
filtering the motor current signal with a bandpass filter to generate a filtered motor current signal;
receiving a pressure signal from a pressure sensor arranged on the circulatory support device;
filtering the pressure signal to generate a filtered pressure signal;
generating a normalized motor current signal based, at least in part, on the filtered motor current signal and the filtered pressure signal;
determining a pulsatility of the normalized motor current signal;
determining a pulsatility of the filtered pressure signal;
determining a differential pressure signal based, at least in part, on the filtered pressure signal;
determining that the circulatory support device is not correctly positioned in the heart of the patient when
(i) the pulsatility of the normalized motor current signal is less than a first threshold value;
(ii) the pulsatility of the filtered pressure signal is less than a second threshold value;
(iii) a maximum value of the differential pressure signal within a time window of predetermined length is greater than a third threshold value; or
(iv) a minimum value of the differential pressure signal within the time window is greater than a fourth threshold value; and
outputting an alarm when it is determined that the circulatory support device is not correctly positioned in the heart of the patient.

* * * * *